United States Patent

[11] 3,628,739

[72] Inventors Fritz Muller, Knapsack near Cologne; Karl-Heinz Stendenbach, Bruhl-Pingsdorf; Franz-Josef Dany, Lechenich; Dieter Steidl, Sulzbach/Taunus; Horst Heinrich Weizenkorn, Efferen near Cologne; Willi Forst, Knapsack near Cologne, all of Germany
[21] Appl. No. 860,275
[22] Filed Sept. 23, 1969
[45] Patented Dec. 21, 1971
[73] Assignee Knapsack Aktiengesellschaft Knapsack near Cologne, Germany
[32] Priority Oct. 3, 1968
[33] Germany
[31] P 18 00 870.3

[54] PROCESS FOR THE MANUFACTURE OF MOST FINELY PULVERIZED RED PHOSPHORUS
2 Claims, 2 Drawing Figs.

[52] U.S. Cl. ................................ 241/17, 241/25, 241/30
[51] Int. Cl. ............................... B02c 17/16, B02c 21/00
[50] Field of Search ............................ 241/15–17, 23, 25, 29, 30; 23/223

[56] References Cited
UNITED STATES PATENTS
3,493,182   2/1970   Szegvari ...................... 241/30 X OTHER REFERENCES
Mellor, J. W. A Comprehensive Treatise on Inorganic and Theoretical Chemistry, N.Y., Longmans, Green. Vol. VIII, 1928, page 746, QD31M4.

Primary Examiner—Donald G. Kelly
Attorney—Connolly and Hutz

ABSTRACT: Production of most finely pulverized red phosphorus, by subjecting an aqueous suspension of red phosphorus with a particle size of between about 50 and 100 microns, produced inside a ball mill from yellow phosphorus and water, to pulverization with agitation to obtain particles with a size between 1 and 20 microns, for example 10 microns, prior to filtering the suspension. The red phosphorus is produced using an apparatus wherein a preliminary tank, a preliminary agitator vessel and a ball mill having an agitator placed therein and filled with glass balls of between 1 and 2 mm. in diameter, are disposed ahead of the filter tank.

A suspension of about 25 weight percent red phosphorus in water was pumped from a filter reservoir to the tank of a rotary filter; the filter tank was provided with a swingable conveyor belt. The filter cake having about 30 weight percent water therein, scraped off from the drum of the rotary filter, was delivered to a trough conveyor maintained under nitrogen, and conveyed from there to a shelf drier maintained under nitrogen. Anhydrous red phosphorus having approximately the following particle sizes was removed from the drier:

80% <40 microns
55% <25 microns
30% <10 microns.

The tank of the rotary filter was required to be freed after some hours from red phosphorus which was found to have deposited therein.

Example 2: (Process of Invention)

A suspension of about 35 weight percent red phosphorus in water was pumped from a preliminary reservoir to a preliminary tank provided with an intense stirrer. Phosphorus which precipitated in the bottom portion of the preliminary tank was continually withdrawn through a slightly opened valve and recycled to the preliminary reservoir. Overflow material coming from the preliminary tank was also recycled to the reservoir.

By means of a worm pump the suspension was conveyed from the preliminary tank to a ball mill equipped with an agitator, and forced to flow upwardly therethrough. The wet-ground suspension was then delivered to a filter reservoir basin and pumped from there to the tank of a rotary filter. The tank had a throttle valve disposed in its bottom portion, which effectively avoided the deposition of red phosphorus; an overflow was used to maintain the depth of immersion of the filter drum constant. The filter cake scraped off contained about 30 percent adhering water and was delivered to a paddle worm drier having nitrogen therein. Anhydrous red phosphorus was discharged therefrom. 97 to 100 percent of the phosphorus was found to have a particle size of <10 microns, depending on the quantity of suspension fed to the ball mill with the agitator therein.

Two exemplary representations of the present invention are shown diagrammatically in the accompanying drawings. Needless to say the invention is in no way limited thereto. It can be modified in various ways without departing from its scope.

In the accompanying drawings.

Figure 1:
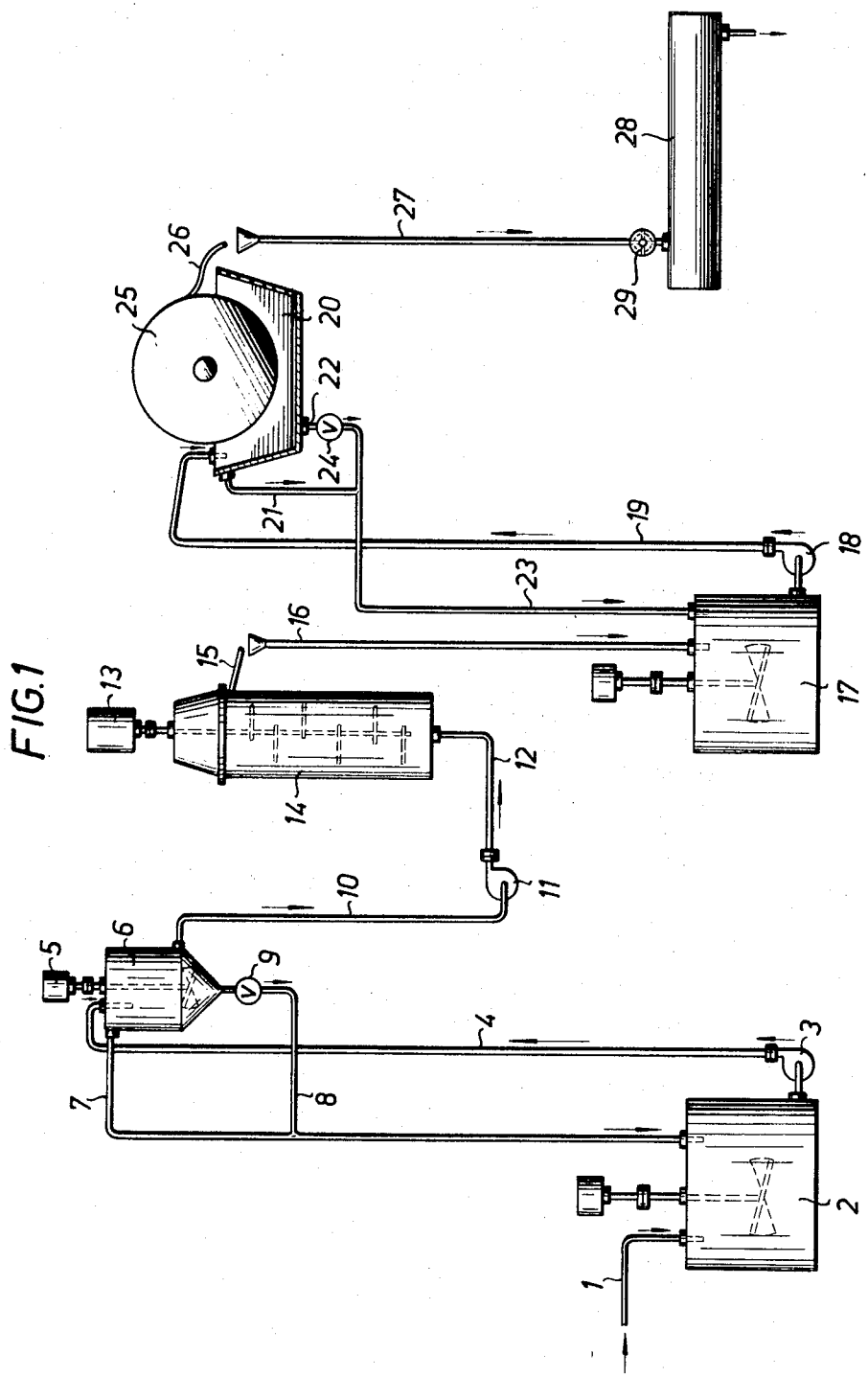
FIG. 1 is an exemplary representation of the invention.

As can be seen feedline 1 is used to supply and at least partially fill preliminary tank 2, which has an agitator connected to it, with the phosphorus-water suspension. Pump 3 serves to convey the suspension through line 4 to preliminary basin 6, which is equipped with an agitator 5 and connected to preliminary tank 2 by means of an overflow line 7 and a discharge pipe 8. Discharge pipe 8 has a discharge valve 9 disposed therein which generally is but slightly opened. This is done to make it possible for red phosphorus, which precipitates in the lower portion of preliminary basin 6 and is no longer fluidized by agitator 5, to be returned to preliminary tank 2. The suspension travels from preliminary basin 6 through line 10 and is pumped by means of pump 11 through line 12 to ball mill 14. Ball mill 14 is connnected to agitator 13 and filled with glass balls 1 to 2 mm. in diameter (these are not shown in the drawing). The suspension coming from ball mill 14 flows through a sieve placed above discharge pipe 15 and is conveyed through pipe 16 to filter tank 17 having an agitator connected to it. By means of a pump 18 and a line 19 the suspension is pumped to rotary filter tank 20, which has an overflow pipe 21 and a discharge pipe 22 connecting tank 20 through line 23 to filter tank 17. Discharge pipe 22 has a discharge valve 24 disposed in it, which generally is but slightly opened.

The filter cake obtained in the rotary filter drum 25 is scraped off by means of a scraper 26 and delivered through down pipe 27 and rotary piston pump 29 to drier 28. Drier 28 advantageously is a paddle worm drier (e.g. a Solidaire-type drier) and is fed with steam of about 150° C. Dry red phosphorus is removed from drier 28 through outlet opening 30.

Figure 2:
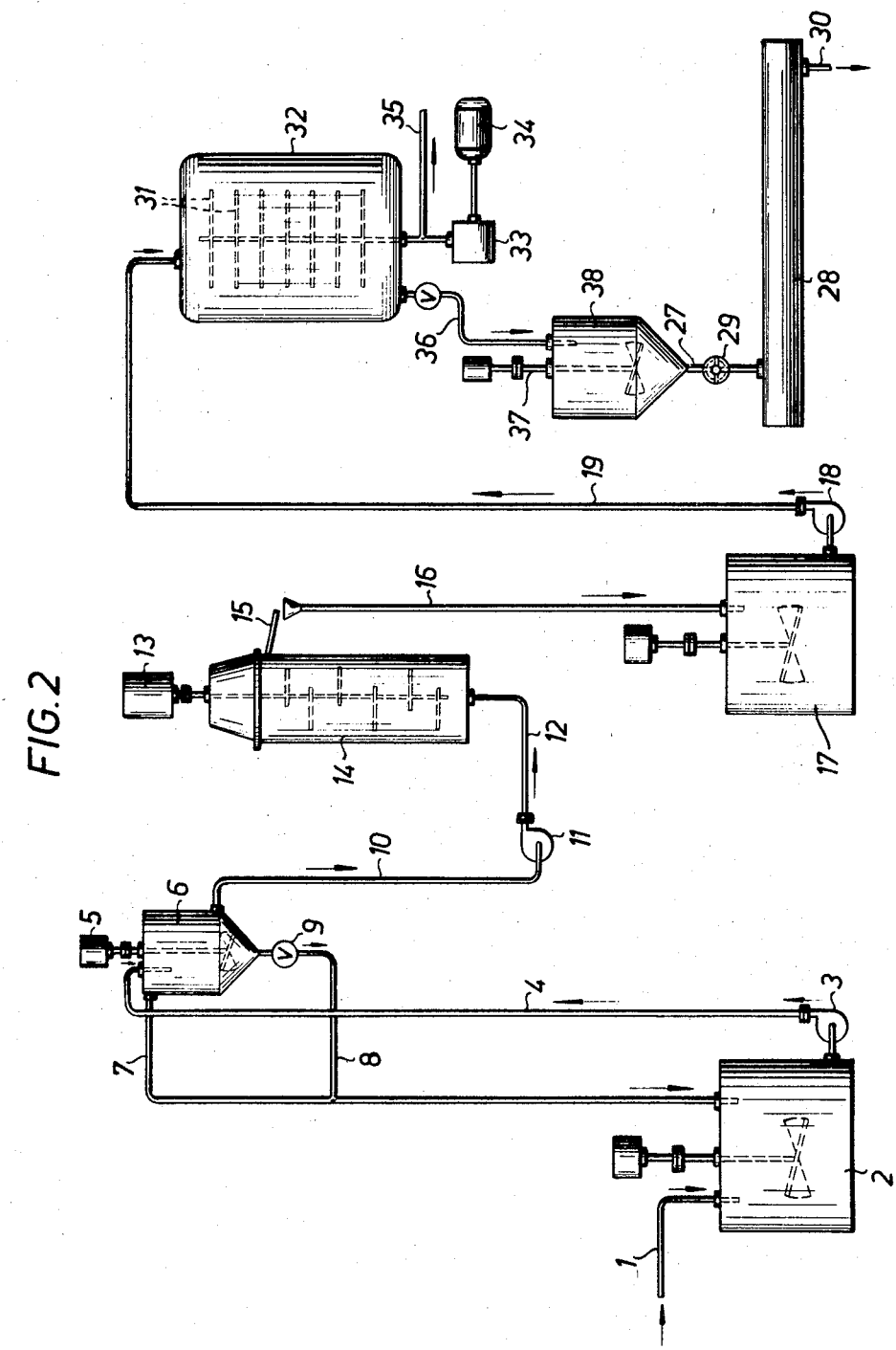
FIG. 2 is a further exemplary representation of the invention.

In accordance with the preferred representation shown in FIG. 2, line 19 is arranged to be connected to a centrifugal filter 32 with plates 31. The centrifugal filter 32 is arranged to be driven by a motor 34 through a transmission 33. Positioned below centrifugal filter 32 is a filtrate outlet 35. Line 36 is used to convey the filter cake from centrifugal filter 32 to a buffer tank 38 connected to agitator 37. From buffer tank 38, the filter cake is delivered through line 27 and a rotary piston pump or worm pump 29 to drier 28. The rotary piston pump preferably is a pump wherein each of the two rotary pistons and the pump casing are arranged to be spaced about 0.5 to 3 mm., preferably 1 mm. apart, leaving a gap therebetween.

We claim:

1. A process for the production of most finely pulverized red phosphorus wherein an aqueous suspension of red phosphorus coming from an agitated filter reservoir zone is pumped to a filter zone, and the resulting filter cake, partially freed from water in the said filter zone, is introduced into a drying zone and dried therein, which comprises pumping an aqueous suspension of red phosphorus with a particle size of between 50 and 100 microns from an agitated preliminary reservoir zone, through an agitated preliminary zone to an agitating/grinding zone for reducing the size of the particles of the red phosphorus down to 1–20 microns, pumping said suspension from said agitating/grinding zone to the said filter zone through the said agitated filter reservoir zone, recycling a portion of the suspension in the agitated preliminary zone to the agitated preliminary reservoir zone, and recycling a portion of the suspension in the filter zone to the agitated filter reservoir zone.

2. The process of claim 1, wherein filter cake obtained by filtration of the said suspension is indirectly dried using steam of about 150° C.

* * * * *